(No Model.)
B. C. SMITH.
NEEDLE BATH.
No. 382,011. Patented May 1, 1888.
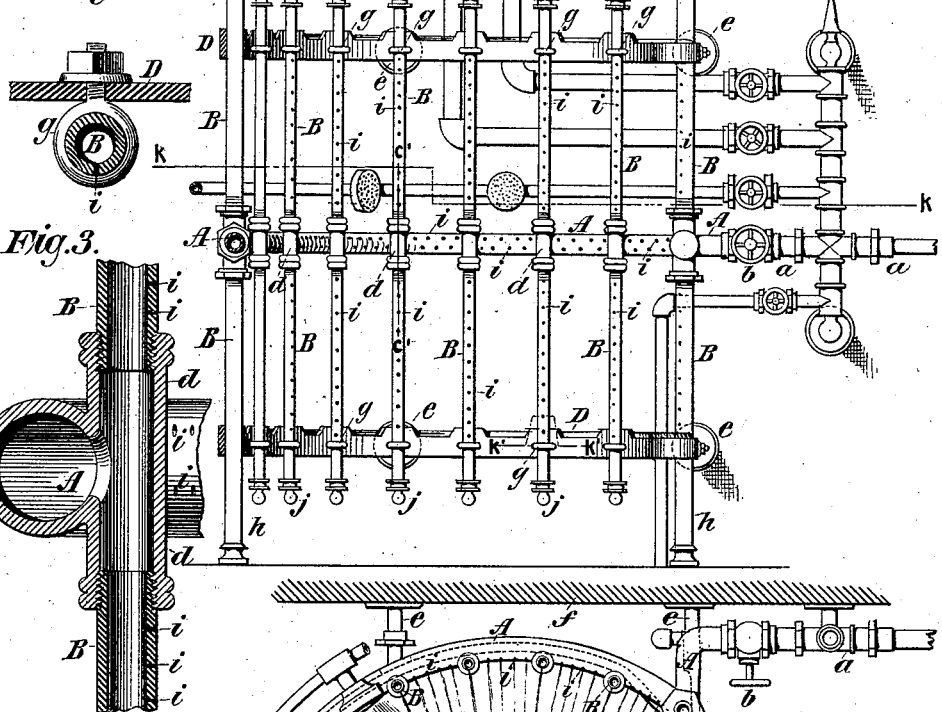
WITNESSES:
Gustave Dietrich
T. F. Bourne
INVENTOR.
Benjamin C. Smith
BY Briesen & Steele
ATTORNEYS.

UNITED STATES PATENT OFFICE.

BENJAMIN C. SMITH, OF BROOKLYN, ASSIGNOR TO FRED. ADEE & CO., OF NEW YORK, N. Y.

NEEDLE-BATH.

SPECIFICATION forming part of Letters Patent No. 382,011, dated May 1, 1888.

Application filed August 26, 1887. Serial No. 247,901. (No model.)

*To all whom it may concern:*

Be it known that I, BENJAMIN C. SMITH, residing in Brooklyn, Kings county, New York, have invented an Improved Needle-Bath, of which the following is a specification.

One object of my invention is to provide a needle-bath in which the water will issue from the jet-holes under a more uniform pressure than heretofore, and another object is to provide a bath in which the water passing in fine jets from the pipe can be directed against the body at different angles.

The invention consists in a centrally located horizontal distributing-pipe combined with a series of vertically-arranged pipes connected by suitable couplings with said horizontal pipe, said vertical pipes extending above and below the horizontal pipe. Said vertical pipes are provided with a series of small holes for the passage of the water. Water enters the vertical pipes from the horizontal pipe near the center of the bath, and it issues from said vertical pipes under uniform pressure. By giving a turn to a vertical pipe the issuing water will be directed against the bather at the desired angle.

The invention also consists in details of construction and combinations of parts, as will be more fully hereinafter set forth.

Reference is to be had to the accompanying drawings, forming part of this specification, in which—

Figure 1 is a vertical central section of a needle-bath constructed according to my invention, the section being taken on the line *c c*, Fig. 2. Fig. 2 is a horizontal sectional view of the same, taken on the line *k k*, Fig. 1. Fig. 3 is a vertical cross-section through the pipes, taken on the line *c' c'*, Fig. 1, showing the manner of connecting the vertical pipes to the horizontal distributing-pipe. Fig. 4 is a horizontal sectional view on the line *k' k'*, Fig. 1, showing the manner of holding the vertical pipes near their outer ends; and Fig. 5 is a section on the line $k^2 k^2$, Fig. 2, showing a different form of coupling.

A in the drawings represents the main distributing-pipe of my improved needle-bath. The pipe A is arranged horizontally near the vertical center of the bath, and is preferably of the circular form shown in Fig. 2. The pipe A is connected with a supply-pipe, *a*, and has a suitable cock or valve, *b*, to regulate the admission and flow of the water.

B B are a series of vertically-arranged pipes connected with the horizontal distributing-pipe A, and they receive their supply of water from said horizontal pipe. For convenience of adjustment the pipes B B are made in two parts and connected to the pipe A by couplings *d d*, as shown. The couplings *d d* are carried by the pipe A and communicate with the interior of said pipe, as in Figs. 3 and 5. The ends of the couplings *d* are screw-threaded to receive corresponding threads on the pipes B B; but the couplings *d d* may be of any other desired construction.

D D are braces for the pipes B B, which are carried above and below the pipe A and follow the direction of said pipe. The braces D D are provided with a number of arms, *e e*, for attachment to a wall, *f*, or other support. The braces D D carry a number of screw-eyes or straps, *g*, or other fastenings, through which pass the pipes B B. By this means the pipes B B are adjustably held in position; but the pipes B B may be otherwise supported, if desired.

A number of the pipes B—say the end and center ones—may extend farther down than the others, as at *h*, and rest upon the floor or other support, if desired. As above constructed, these longer pipes B B support the pipe A. The pipes B B are provided with a series of holes, *i i*, as shown, from which the water escapes in fine jets. On the free ends of the pipes B B are screwed caps *j*, which may be readily removed when the pipes are to be cleaned.

It is evident that the pipes B B, instead of being divided where they meet the pipe A, could be in single lengths and connected to the pipe A by means of a coupling; but I prefer the construction shown.

To use this bath, water is first admitted to the central horizontal distributing-pipe, A. It passes thence through the couplings *d d* into the vertical pipes B B and issues from the holes *i i* in fine jets. By causing the water to enter the vertical pipes B B at the center of the bath the water issues from the holes $i\ i$ under uniform pressure. When it is desired to have the water from the jets strike the bather at different angles, it is only necessary to turn one or more of the pipes B. This is permitted by holding the pipes B in the couplings $d$ and straps $g$, as described. The pipe A is or may be provided with a series of holes, $i\ i$.

Having now described my invention, what I claim is—

In a needle-bath, the combination of the central horizontal distributing-pipe, A, couplings $d\ d$, carried by said pipe, vertical pipes B B, fitting said couplings, braces D D, and straps $g$, all arranged for operation substantially as herein shown and described.

BENJAMIN C. SMITH.

Witnesses:
THOMAS J. TRACY,
HARRY M. TURK.